Figure 3:
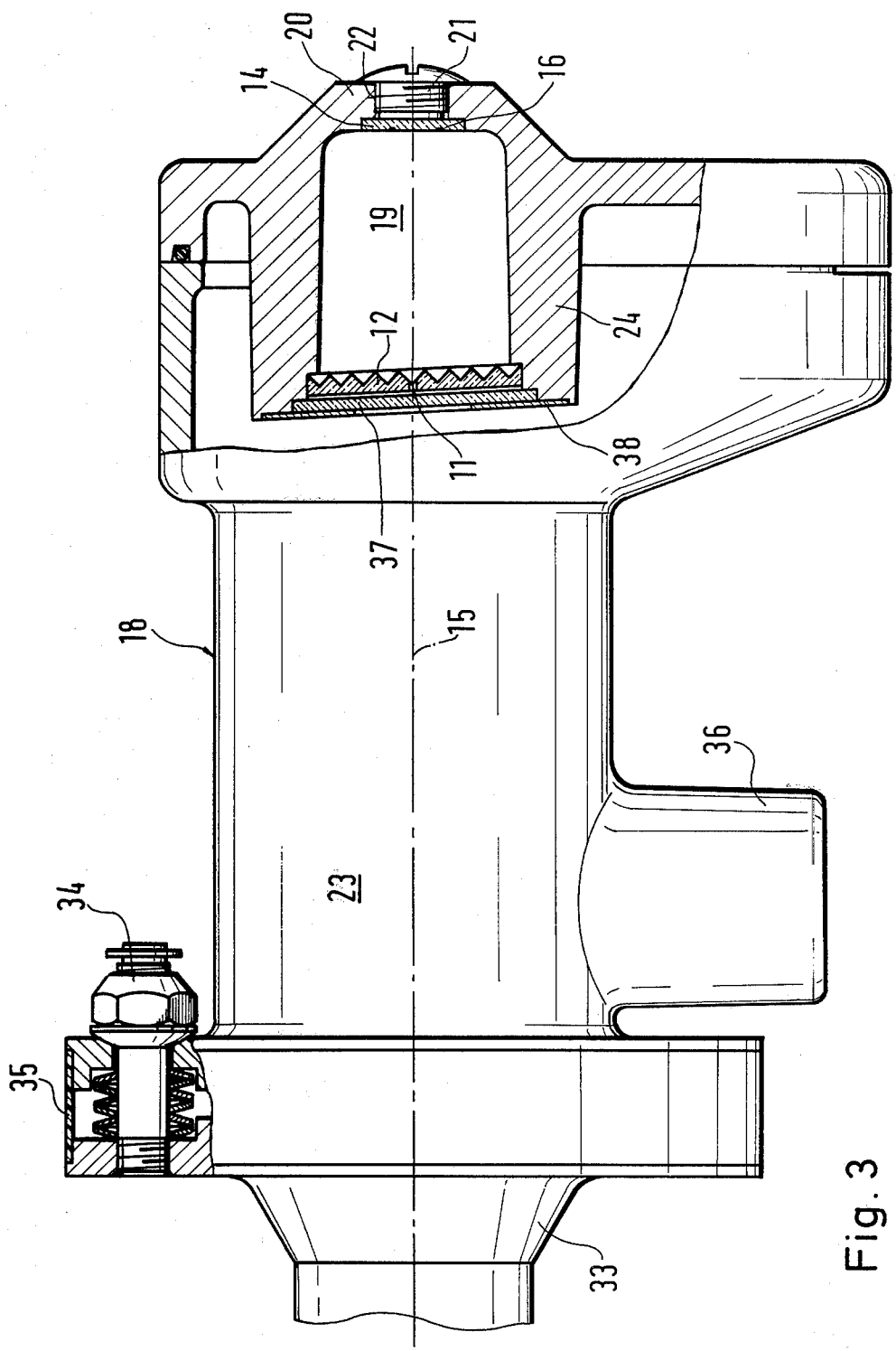

United States Patent [19]

Sick

[11] 3,915,575

[45] Oct. 28, 1975

[54] REFLECTOR ARRANGEMENT
[75] Inventor: Erwin Sick, Waldkirch, Germany
[73] Assignee: Erwin Sick Optik-Elektronik, Waldkirch, Germany
[22] Filed: Oct. 1, 1974
[21] Appl. No.: 510,883

[30] Foreign Application Priority Data
Oct. 24, 1973 Germany................. 7338222[U]

[52] U.S. Cl.................. 356/152; 33/286; 350/103; 356/138; 356/154
[51] Int. Cl.²......................................... G01B 11/26
[58] Field of Search........... 356/4, 5, 141, 152, 138, 356/154; 350/100, 102, 103; 33/286, 293

[56] References Cited
UNITED STATES PATENTS

| | | | |
|---|---|---|---|
| 3,464,770 | 9/1969 | Schmidt | 356/4 |
| 3,528,747 | 9/1970 | Walsh | 356/154 |
| 3,567,326 | 3/1971 | Vaniz | 356/152 |
| 3,614,439 | 10/1971 | Beelik, Jr. et al. | 356/152 |
| 3,736,058 | 5/1973 | Iadarola | 356/4 |

Primary Examiner—Maynard R. Wilbur
Assistant Examiner—S. C. Buczinski

[57] ABSTRACT

A reflector arrangement for use with an optical device having a light transmitter and receiver.

The reflector arrangement has a reflector with an aperture, and a sighting plate and, in use, light from the light transmitter impinges on the reflector and some of the light passes through the aperture to be received on the sighting plate. Light reflected from the reflector is thrown onto the light receiver, and correct alignment of the transmitted and received light is obtained by moving the reflector arrangement about at least two axes perpendicular to the optical axis of the arrangement until the image of the light transmitter is centered on the sighting plate.

The sighting plate is viewed from behind to make the necessary adjustment to the reflector arrangement.

17 Claims, 3 Drawing Figures

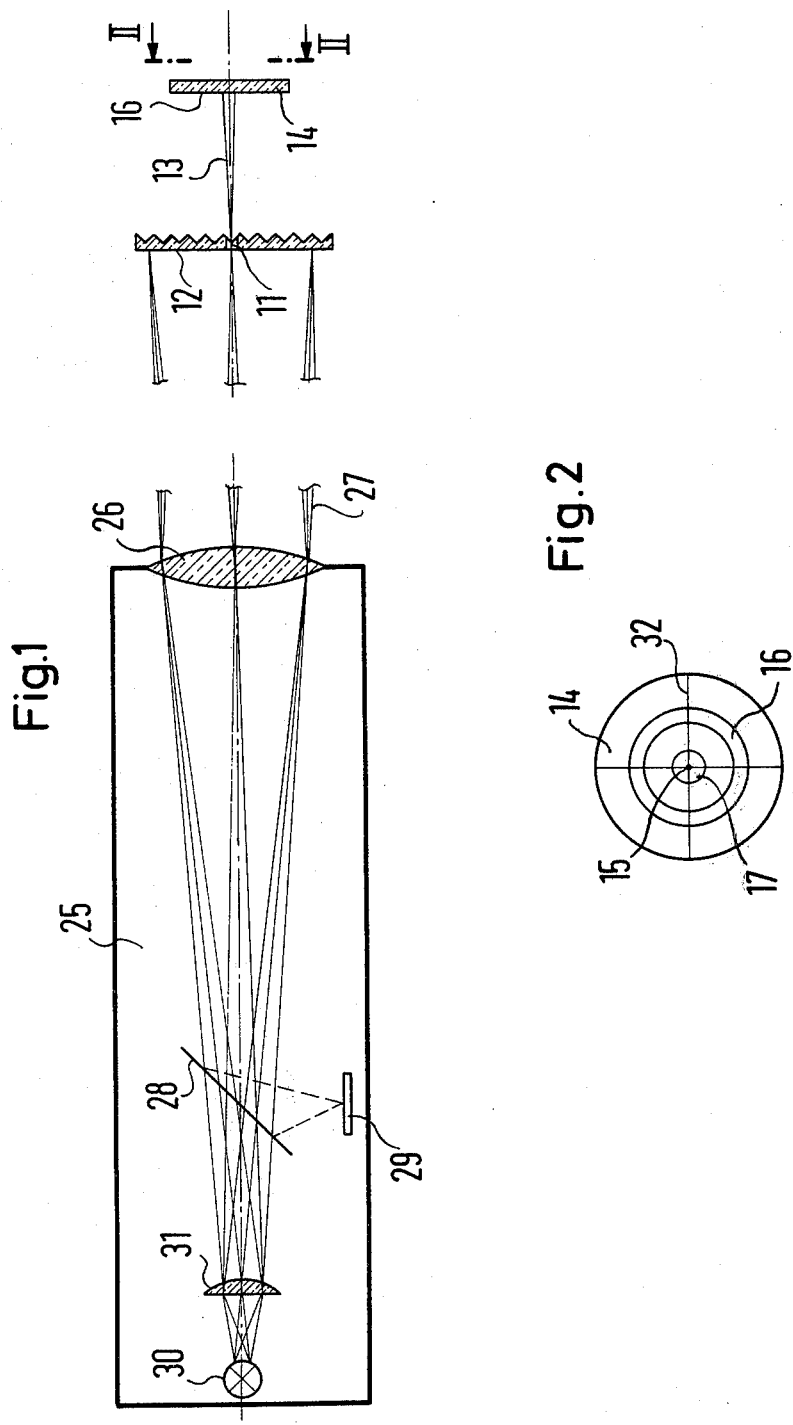

REFLECTOR ARRANGEMENT

The invention relates to a reflector arrangement for use in optical instruments which comprise light transmitters and light receivers disposed at a distance from the reflector arrangement, the light directed by the light transmitter onto the reflector being thrown by the latter onto the light receiver.

Reflector arrangements of this kind are used for example in optical smoke density measuring instruments or so-called transmissometers. In such cases, the light transmitter and light receiver are combined by means of an autocollimation optical path in one instrument which is disposed at a distance from the reflector arrangement. As a rule the light transmitter transmits a substantially parallel light pencil, which should be reflected by the reflector back into itself and onto the light receiver.

A difficulty occurs in accurately aligning the reflector arrangement in relation to the light transmitter and receiver disposed at a certain distance from it. This alignment is particularly difficult when the reflector is made, in the usual manner, of retroreflective material, for example triple mirrors, which return the incident light into itself substantially independently of the direction of incidence. For this reason the light beam reflected back cannot be used for adjustment, as would for example be possible in the case of plane mirrors. On the other hand, accurate adjustment of the reflector is nevertheless also necessary when retroreflective material is used, because, depending on the tilt angle, certain fluctuations of intensity of the reflected light beam may nevertheless occur, which, although they cannot be detected by the naked eye, may still appreciably falsify the sensitive measurements made with instruments of this kind.

For this reason the aim of the invention is to provide a reflector arrangement of the kind first mentioned above, which can easily be brought into accurately predetermined alignment in relation to the incident light beam.

According to the invention we provide a reflector arrangement for use with an optical device comprising a light transmitter and a light receiver disposed at a distance from the reflector arrangement, which arrangement comprises a reflector having an aperture therein, and a sighting plate in a predetermined position relative to the reflector, the reflector arrangement, in use, being disposed to receive light from the transmitter so that light passes through the aperture and is received on the sighting plate, the reflector arrangement being mounted for movement for adjustment purposes about at least two axes substantially perpendicular to the direction of the incident light beam. Using the principle of a pinhole camera, an image of the light transmitter is projected through the hole and onto the sighting plate, and by turning the reflector arrangement this image can be brought accurately to the predetermined position. The desired adjustment can thus be achieved. For this purpose the reflector may also without difficulty be disposed at an angle differing from 90° in relation to the incident light beam. The arrangement of the invention moreover enables this adjustment to be reproduced with great accuracy. This is particularly important in smoke density measuring instruments, which are first calibrated in a reference beam path. The instrument must then be disposed in exactly the same arrangement in the chimney in which the density of smoke is to be measured. The adjustment facility provided by the invention is very helpful in this respect.

Preferably the hole is so situated in the reflector that the sighting plate receives light substantially at its centre, the sighting plate preferably being a ground glass screen, so that the adjustment can be made by viewing the sighting plate from the rear.

One or more sighting lines may be provided on the sighting plate, an annular sighting line preferably being provided around the point of intersection of the optical axis of the arrangement with the sighting plate. The sighting line should have a slightly greater diameter than the light spot projected through the hole.

Behind the reflector the casing preferably has a cavity which is closed by the ground glass screen inserted in the rear wall.

The ground glass screen may be mounted on the inner side of the rear wall and behind the ground glass screen a closure screw, which can be screwed out, may be provided which closes the viewing aperture. During normal operation the ground glass screen can in this way be protected against dirt, so that when required it is always available again in perfect condition after screwing out the closure screw, for example for the purpose of checking the correctness of the adjustment after a certain period of operation.

Although the invention may in principle also be applied to normal specular reflectors, the reflector is preferably made of retroreflective material, such as triple mirrors.

In order to avoid specular reflections on the reflecting glasses normally provided in front of the reflectors, it is preferred that the reflector encloses with the incident light beam an angle differing slightly from 90°. In this case also the required adjustment can be very accurately reproduced in a simple manner by means of the reflector arrangement of the invention.

In order to avoid the soiling of the reflector arrangement, particularly when it is used in smoke density measuring instruments, a scavenging air space may be provided in front of the reflector.

The reflector may be mounted on an annular base projecting inwards from the rear wall of the casing. The exact relative position of the reflector and sighting plate is thereby obtained with great accuracy. Preferably the distance between the sighting plate and the reflector should be so selected that an angular resolution of the order of about 1° is still obtained. Only in the event of angle fluctuation of more than 1° will any marked, disturbing fluctuations of intensity occur in the reflected light.

A preferred embodiment of the invention is described below with the reference to the accompanying drawing, in which:

FIG. 1 is a diagrammatical side elevation of a reflector arrangement applied to a light transmitter and reflector working on the autocollimation principle, FIG. 2 is a view on the line II—II in FIG. 1, and FIG. 3 is a side elevation partly in section of a form of construction of the reflector arrangement of the invention.

According to FIG. 1, a light transmitter and receiver 25 contains a light source 30 whose light is formed by lens elements 26, 31 into a substantially parallel pencil of light 27. The light pencil 27 is reflected back into itself by a reflector 12 consisting of triple mirrors, and in the light transmitter and receiver 25 it is reflected at a diagrammatically indicated splitter mirror 28 to a photoreceiver 29 whose output signal is then electronically processed.

According to the invention the reflector 12 has at its centre a hole 11 which is of such dimensions that a narrow light pencil 13 can pass through the reflector 12 and reach a ground glass screen 14 which is disposed some distance therefrom, and which according to FIG. 2 carries a circular sighting line 16. The sighting line has its centre at the point through which the optical axis should pass when the adjustment is correct. In addition, crosshairs 32 may if necessary also be provided.

An image of the light transmitter and receiver 25 is formed through the hole 11, at 17 on the ground glass screen 14. By suitably tilting the reflector arrangement about axes at right angles to the optical axis 15, the light spot 17 can be positioned concentrically to the sighting line 16, whereupon the desired adjustment has been achieved.

According to FIG. 3, the reflector arrangement of the invention is fastened by its front part 33 to any stationary part. The rear part of the reflector arrangement, consisting essentially of a casing 18 and a rear wall 20, can be tilted within determined limits in relation to the front part 33 about axes perpendicular to the optical axis 15 by means of adjusting screws 34. Elastic material 35 connects the two parts in such a manner that dirt cannot enter but that mutual movability within the required limits is ensured. A total of two adjusting screws 34 and a non-adjustable joint are provided on the periphery, so that the desired movability about two axes which are perpendicular to the optical axis 15, and which in turn should likewise be made perpendicular to one another, is ensured.

In the rear part 18 is provided first of all a scavenging air space 23 into which air is blown through a pipe connection 36, this air passing out through the front end 33. In this way soiling of the actual reflecting parts contained in the rear portion of the casing 18 is avoided.

The reflector 12 is fastened on an annular base 24 projecting from the rear wall 20. In front of the reflector 12 is provided a protective glass 37, and in front of the latter a protective ring 38 having a central aperture is also provided.

Behind the reflector 12 is thus formed a cavity 19 the rear end of which is closed by the ground glass screen 14, which fits into an annular depression on the inner side of the rear wall 20. Behind the ground glass screen 14 the rear wall 20 has a viewing aperture 22, which however is normally closed by a closure screw 21 in order to avoid damaging or soiling the ground glass screen 14 during rough operation.

For the purpose of adjustment, the closure screw 21 is screwed out of the viewing aperture 22. The operator now observes the light spot 17 shown in FIG. 2, and by turning the nuts of the adjusting screws 34 attempts to bring the light spot into the concentric position in relation to the sighting line 16, as shown in FIG. 2. AS soon as this position has been achieved, the adjustment has been made and the closure screw can be screwed in again.

What is claimed is:

1. A reflector arrangement for use with an optical device comprising a light transmitter and a light receiver disposed at distance from the reflector arrangement, said arrangement comprising a reflector having an aperture and a sighting plate at a spaced distance relative to the reflector, the reflector, in use, being disposed to receive light from the transmitter so that light passes through the said aperture and is received on said sighting plate and disposed to reflect light back to said receiver, means mounting the said arrangement being provided, and means also being provided for moving the arrangement about at least two axes substantially perpendicular to the direction of the transmitted light beam.

2. The arrangement set forth in claim 1 wherein the sighting plate is mounted in a fixed position relative to the reflector.

3. The arrangement set forth in claim 1 wherein the sighting plate is so positioned relative to the reflector that the said plate receives light substantially at its centre.

4. The arrangement set forth in claim 1 wherein the sighting plate is a ground glass screen.

5. The arrangement set forth in claim 1 wherein one or more sighting lines are provided on the sighting plate.

6. The arrangement set forth in claim 5 wherein at least one annular sighting line is provided around the point of intersection of the optical axis with the sighting plate.

7. The arrangement set forth in claim 6 wherein the one or each annular sighting line has a larger diameter than the light spot thrown onto the sighting plate.

8. The arrangement set forth in claim 1 wherein the reflector element and sighting plate are mounted in a casing, said casing including a cavity which is closed at one end by the sighting plate.

9. The arrangement set forth in claim 8 wherein the sighting plate is mounted on the inner side of the rear end of said casing, a closure screw, which can be screwed out, being provided behind the sighting plate to close the viewing aperture.

10. The arrangement set forth in claim 1 wherein the reflector is made of retro reflective material.

11. An arrangement as claimed in claim 10 wherein the reflector element is made of triple mirrors.

12. The arrangement set forth in claim 8 wherein the angle between the reflector element and its incident light beam differs slightly from 90°.

13. The arrangement set forth in claim 8 wherein a scavenging air space is provided in a portion of the casing which extends in front of the reflector element, between said element and the light transmitter.

14. The arrangement set forth in claim 8 wherein an annular base projecting inwardly from the rear wall of the casing is provided on which is mounted the reflector element.

15. The arrangement set forth in claim 1 wherein the distance between the sighting plate and the reflector element is so selected that an angular resolution of 1° is obtainable.

16. The arrangement set forth in claim 8 wherein a protective glass is provided in front of the reflector element between the element and the light transmitter.

17. An optical device comprising
 a. a casing which contains a light transmitter, a light receiver and a reflector arrangement for reflecting the light from the transmitter onto the receiver.
 b. means mounting said reflector arrangement to said casing c. means for moving said reflector arrangement about at least two axes substantially perpendicular to the direction of the transmitted light beam and wherein said reflector arrangement comprises a reflector having an aperture, and a sighting plate at a spaced distance relative to the reflector, light from the light transmitter passing through said aperture and being received on the sighting plate, and wherein light reflected by the reflector is thrown onto the light receiver.

* * * * *